(12) United States Patent
Walters (10) Patent No.: US 6,363,346 B1
(45) Date of Patent: Mar. 26, 2002

(54) CALL DISTRIBUTION SYSTEM INFERRING MENTAL OR PHYSIOLOGICAL STATE

(75) Inventor: T. Scott Walters, Centerville, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/469,650

(22) Filed: Dec. 22, 1999

(51) Int. Cl.[7] ................ G10L 15/02; G10L 21/06; H04M 11/00; H04M 15/00
(52) U.S. Cl. ............ 704/231; 704/270; 379/93.17; 379/112.05
(58) Field of Search ................ 704/270–273, 704/200.1, 231; 379/93.17, 112.05

(56) References Cited

U.S. PATENT DOCUMENTS

| | | | |
|---|---|---|---|
| 4,490,840 A | * 12/1984 | Jones | 704/274 |
| 5,537,436 A | * 7/1996 | Bottoms et al. | 375/222 |
| 6,006,188 A | * 12/1999 | Bogdashevsky et al. | 704/270 |
| 6,055,501 A | * 4/2000 | MacCaughelty | 704/272 |
| 6,058,435 A | * 5/2000 | Sussin et al. | 709/331 |
| 6,173,260 B1 | * 1/2001 | Slaney | 704/250 |

OTHER PUBLICATIONS

"Standardized Course of Instruction for Voice Stress Analysis Examiners" syllabus by the Diogenes Company, Jul. 1998.*

* cited by examiner

Primary Examiner—Richemond Dorvil
Assistant Examiner—Daniel A. Nolan
(74) Attorney, Agent, or Firm—Gregory A. Welte (57) ABSTRACT

A telephone call reception system which infers mental and/or physiological states of callers. Two types of analysis are available, and both types may be used upon the telephone calls. In one type, speech recognition is performed upon the call to generate a text file. Key words are sought in the text file. In the second type, the electrical signal itself is processed, as by a spectral analysis. Information obtained by the two analyses is used to predict the mental or physiological state of the caller.

4 Claims, 6 Drawing Sheets

CALL DISTRIBUTION SYSTEM INFERRING MENTAL OR PHYSIOLOGICAL STATE

The invention concerns call distribution centers which perform advanced analyses of incoming calls, such as (1) speech recognition to ascertain verbal content of the call, or (2) spectral analysis of the call signal itself, to ascertain physiological state of the caller, or both (1) and (2).

BACKGROUND OF THE INVENTION

Figure 1:
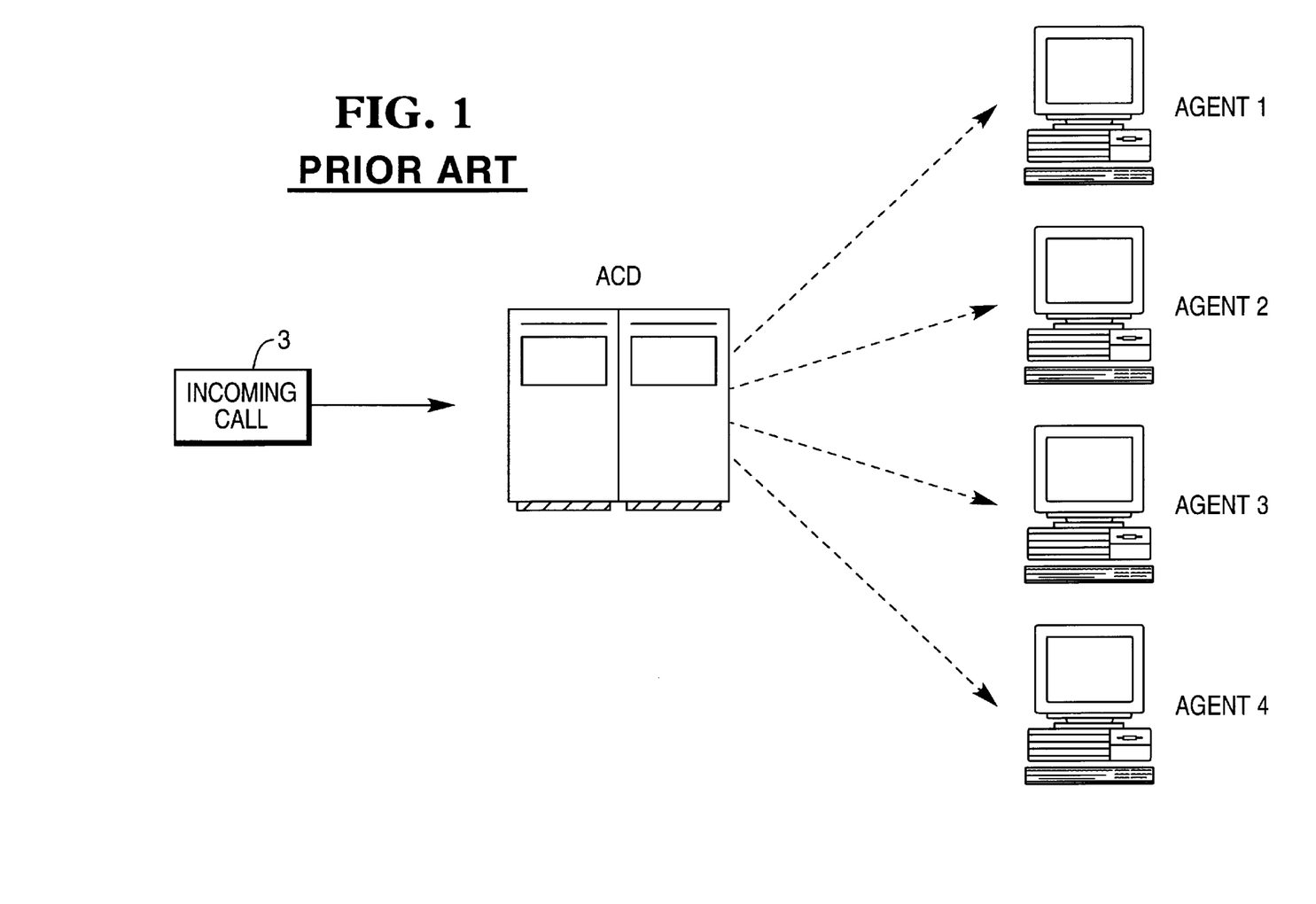
FIG. 1 illustrates an ACD.

Automated Call Distribution centers, ACDs, are well known, and are widely used in retail telephone merchandising. FIG. 1 is a schematic illustration of one type of ACD. The ACD receives an incoming telephone call 3, locates a free AGENT, and routes the call to that free AGENT. The AGENT deals with the incoming call, as appropriate. If no AGENTs are presently available, the ACD routes the call to a recording center (not shown), which records the call, and delivers the recorded call to an AGENT at a later time.

In general, a primary purpose of the AGENTs is to fulfill the needs, or identify the intentions, of the calling parties. However, in some situations, the calling parties are not always able to articulate their needs. For example, a small child calling an ACD at a police department, seeking assistance in an emergency, may experience difficulty in explaining a problem.

In other situations, a calling party may intentionally, but innocently, conceal that party's intentions. For example, a calling party may be very dissatisfied with a product previously provided by the organization which operates the ACD. But that party may originate from a cultural background in which vigorous complaining is considered inappropriate. Further, the AGENT receiving the call may originate from another cultural background, in which such complaining is considered commonplace. In such a situation, the point of view of the caller may not be correctly communicated to the AGENT.

In yet other situations, calling parties may intentionally conceal their intentions, but in a non-innocent manner, as when they wish to engage in trickery or fraud.

Therefore, it is clear that telephone communication, of itself, is not an ideal communication medium for conveying the intentions of a calling party.

OBJECTS OF THE INVENTION

An object of the invention is to provide an improved ACD.

A further object of the invention is to provide an ACD which indicates certain aspects of the state-of-mind of callers.

A further object of the invention is to provide an ACD which applies advanced analysis techniques to the voice signal delivered by callers.

SUMMARY OF THE INVENTION

In one form of the invention, speech recognition is performed on incoming calls. Key words are identified within the call, thereby allowing the call to be classified into one of several possible classifications.

DETAILED DESCRIPTION OF THE INVENTION

Figure 2:
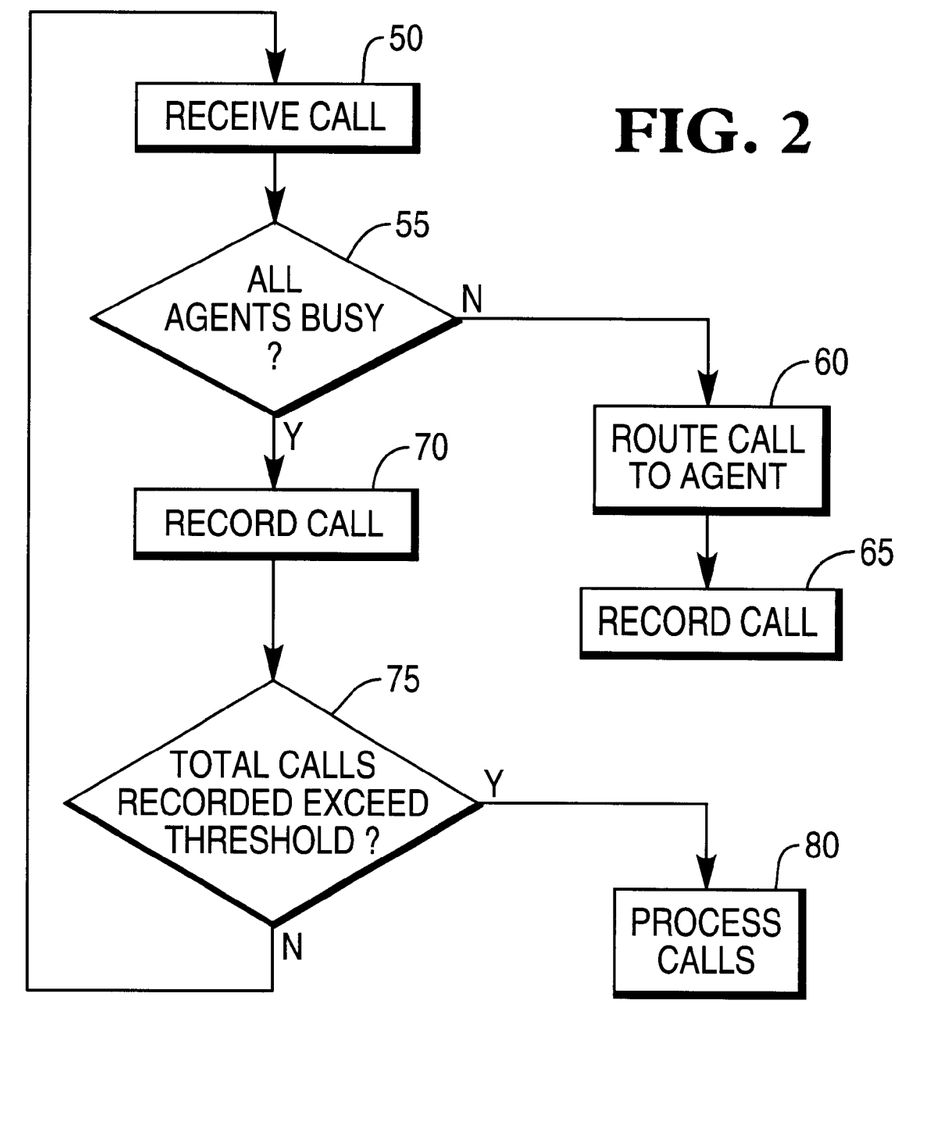
FIGS. 2–5 and 7 are flow charts illustrating logic undertaken by various forms of the invention.

FIG. 2 illustrates one form of the invention. In brief, FIG. 2 indicates that all incoming calls to an ACD are recorded, whether or not the calls are routed to agents. For example, if a call is routed to an agent, the agent-caller conversation is recorded. If a call is routed to a recorder, it is, of course, also recorded.

Block 50 indicates that a call is received by an ACD. Decision block 55 inquire s whether all agents are busy. If not, the NO branch is taken, and block 60 routes the call to a free agent. Block 65 indicates that the call is recorded. If decision block 55 determined that all agents were, in fact, busy, the YES branch is taken, and block 70 is reached, wherein the call is recorded.

Decision block 75 inquires whether the total number of calls recorded exceeds a threshold. If not, the NO branch is taken, and the logic returns to block 50. If so, block 80 indicates that the calls recorded so far are processed, in a group.

FIG. 2 indicates that all calls are recorded, and that the processing of block 80 is undertaken after the calls are recorded. However, this is a generalization. The actual approach taken at a given ACD will depend upon the type of processing, and the type of equipment performing the processing, at the ACD. If the equipment is sufficiently fast, and the processing sufficiently simple, the processing may be undertaken in real-time, as the calls are received. Otherwise, the processing may be undertaken after calls are received, and performed upon recorded calls.

Figure 3:
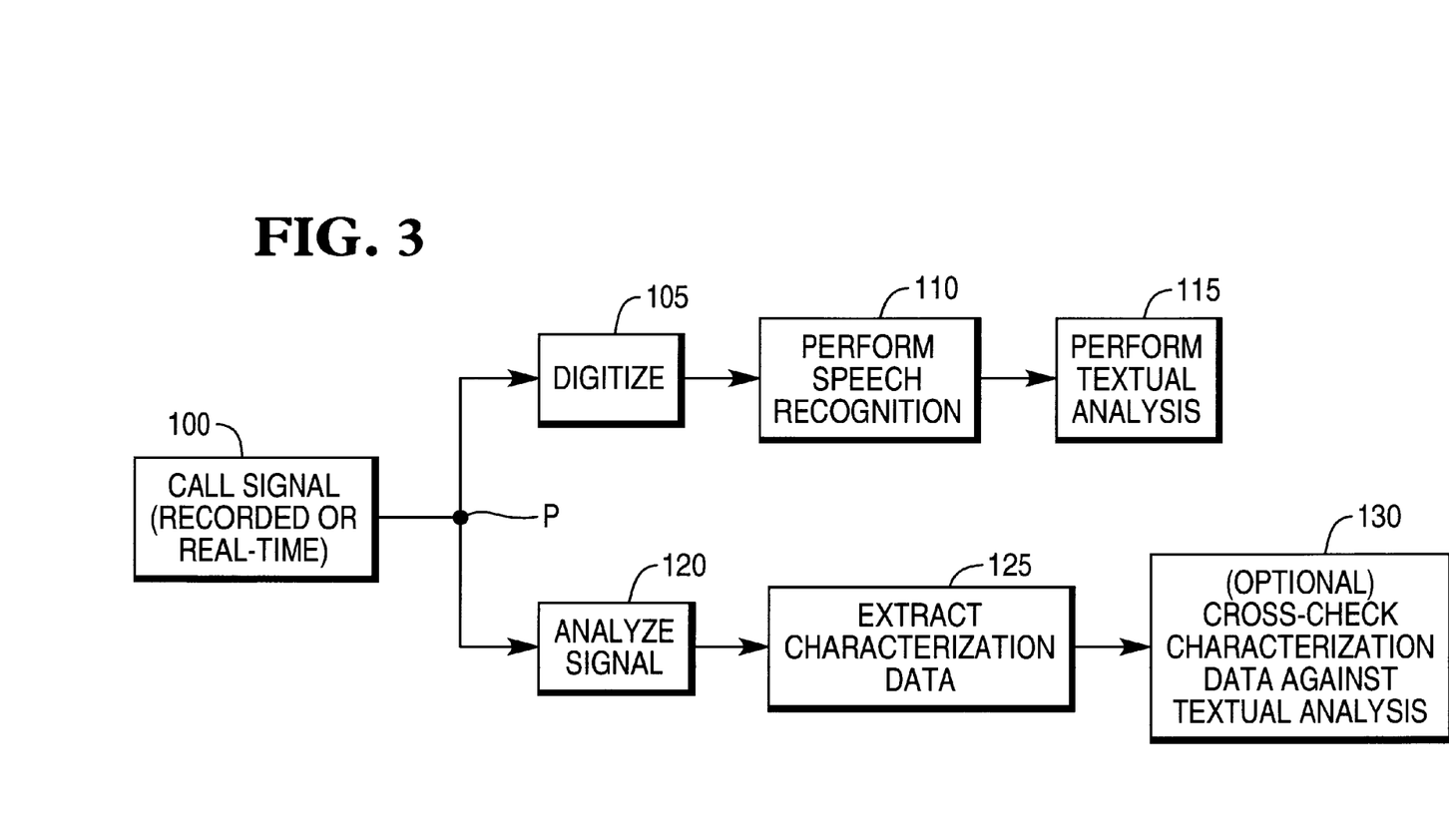

FIG. 3 is an overview of the signal processing applied to the calls. Block 100 indicates that the signal representing the call, either recorded or received in real-time, undergoes the processing indicated by the subsequent blocks. Two types of processing are undertaken, which are separated by the branch-point P.

One type utilizes speech recognition. In block 105, the signal is digitized, and block 110 performs speech recognition. Speech recognition is known in the art. One definition of "speech recognition" refers to the process of deriving alphanumeric text, such as words found in a dictionary, from an analog speech signal which has been digitized. As applied in the present context, the speech signal of the call, in effect, is converted into printed text.

In block 115, a textual analysis is performed upon the digitized speech. Several types of textual analysis are possible.

For example, research indicates that men and women, at least in the English language, tend to utilize different word patterns. Block 115 may include a process of identifying those patterns in the call, and thereby classifying the caller as male or female.

As another example, the textual analysis of block 115 may look for key words. Those key words may include, without limitation, (1) product names or model numbers; (2) words expressing anger or exasperation, such as epithets or "swear words;" and (3) words expressing praise.

As a general approach, a list of key words is generated in advance, by the designer of the logic represented in FIG. 3. Then, the processing step of block 115 searches the text of each call for those words. If key words are found in a call, the call can be categorized. For instance, a call containing the key words "model number 555" can be categorized as concerning that model number. As another instance, a call containing epithets can be classified as "angry caller." As yet another instance, a call containing numerous epithets can be classified as "very angry caller."

As a third example, the analysis may look for recurrence of specific words. If a caller repeatedly uses a word, it may be inferred that the caller attaches significance to that word. Thus, this analysis may develop a histogram of (1) each word used against (2) the number of times used. This analysis selects the most often-used words, such as the five most often-used words, and identifies those to the agent. Insignificant words, such as "the" and "a" may be omitted. The most-often-used words may convey information about the caller to the agent.

As a fourth example, the invention may identify words which are not generally used by the population-at-large. That is, in a preliminary step, the invention may identify the vocabulary used by the majority of people in a population, as by listing the words used for one week in the 50 largest newspapers read by that population. Those words are placed in a list. Block 115 in FIG. 3 identifies words, in a call, which are not contained in this list, thereby identifying unusual words.

In identifying calls which contain words which are not commonly used, the invention perhaps provides some information as to the educational background of the caller.

Therefore, the logic represented by blocks 105, 110, and 115 performs a categorization of each call, based upon an analysis of the words contained within the call. The information used to categorize the call, or the resulting classification into which the call is placed, are recorded along with the call, or in association with the call, so that this information can be retrieved along with the call.

The second type of processing involves signal processing generally, and begins with block 120, which refers to analysis of the signal. Several types of analysis are discussed later. However, it is important to observe a primary distinguishing feature between the second type of processing and the first type. In the first type (beginning with block 105), the analysis is based on the words derived from the caller's speech. The analysis focuses on (1) individual words, (2) word patterns, (3) statistical frequency of words, either within the call itself, or compared with the usage of the population at large or (4) other approaches to using a speaker's words to gain information about the speaker.

In contrast, the processing of the second type is not based on textual, verbal, or symbolic content. The second type of analysis focuses on non-verbal factors and the extraction of characterization data from the non-verbal data as shown in block 125. The results of this non-verbal analysis may thereafter be compared with the results of the textual analysis as shown in block 130. The non-verbal analysis is based on a mathematical analysis of the time-varying signal which is delivered by the telephone system to the ACD.

Figure 4:
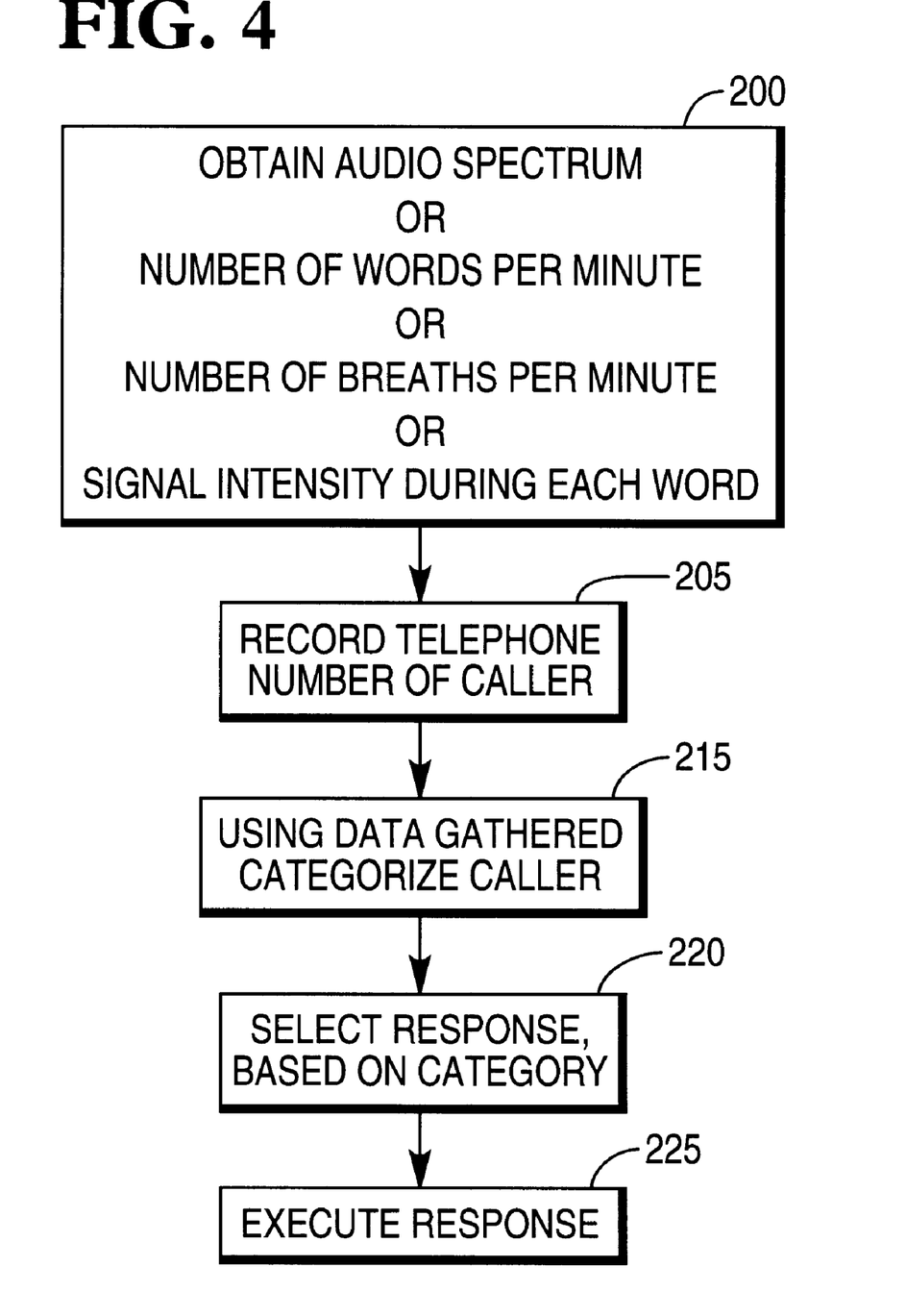

FIG. 4 illustrates several types of processing which can be undertaken. Block 200 indicates that (1) an audio spectrum is taken of the speech signal within the call, and (2) the number of words spoken per minute are counted. The latter can be determined by counting the number of pauses which occur between words. Block 200 also indicates that (3) the number of breaths per minute of the caller are counted, and (4) the signal intensity, also called "inflection," is taken, as a function of time, for each word. These parameters allow inferences about the physiological state of the caller to be made.

Numerous approaches exist in the prior art for inferring the mental or emotional state of a person, based on analysis of non-verbal factors contained in the person's speech.

Block 205 indicates that the telephone number of the caller is recorded. This can be obtained from the "caller ID" service offered by telephone companies, or from block 115 in FIG. 3, which locates the telephone number if spoken by the caller. Alternately, a message can be played to the caller, requesting that the caller either speak the telephone number, or dial that telephone number, by executing telephone keypresses.

Block 215 indicates that the data gathered from analyzing the telephone signal is used to categorize the caller. For example, one category may refer to callers who exhibit symptoms of stress. A subset of this category may refer to callers who, in addition, have identified a specific problem to the ACD. A response to the caller may be selected and executed based upon the categorization of the caller, as illustrated in blocks 220 and 225.

Additional Embodiment

In the preceding discussion, the classification of, or conclusion as to the mental state of, the caller was made by a computer. In another form of the invention, the process is undertaken by a human being. This is possible because it is well known that trained health professionals, such as psychiatrists, psychologists, and speech pathologists, can obtain a large amount of information about a person, merely based on hearing the person's speech.

Figure 5:
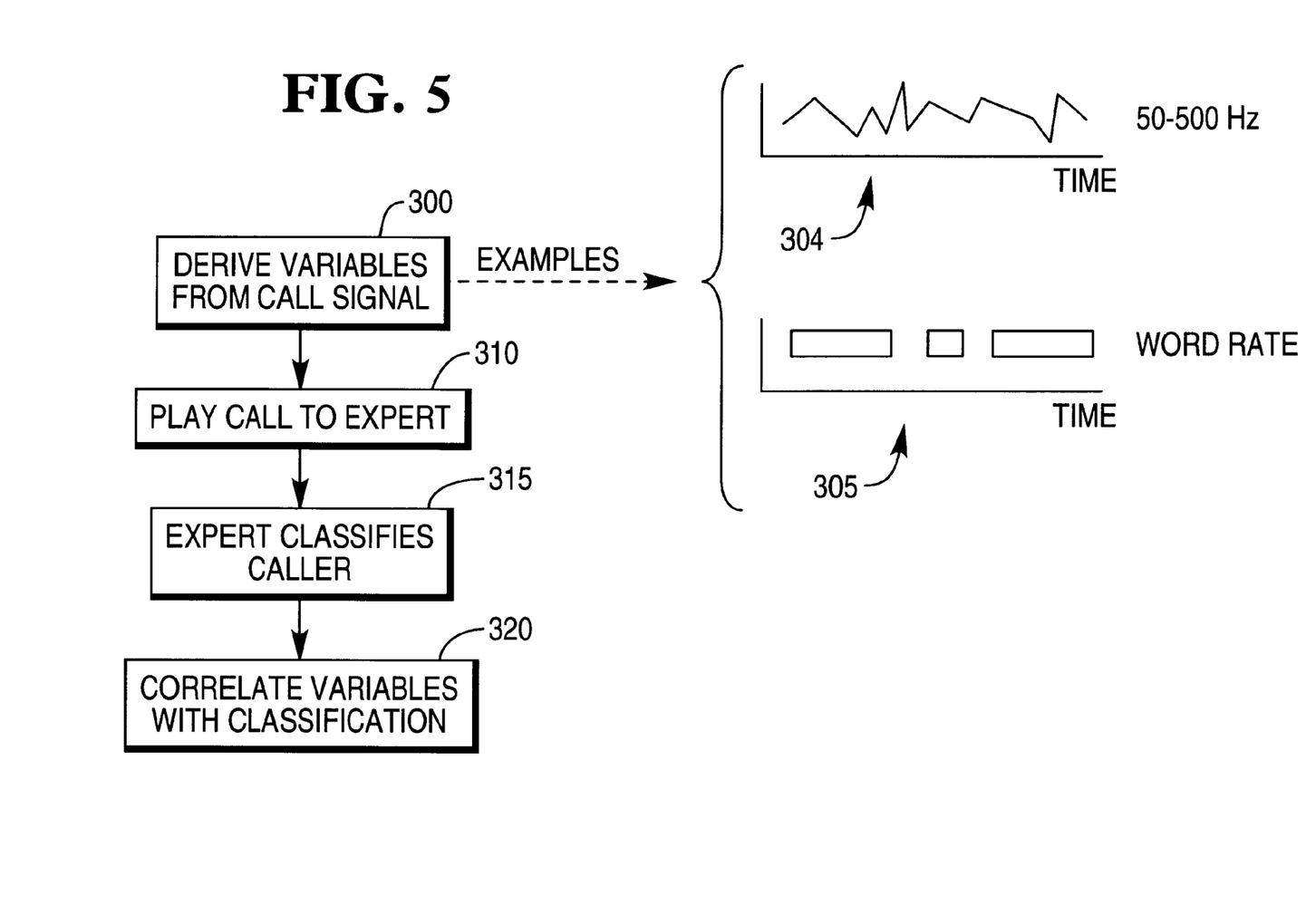

In FIG. 5, block 300 indicates that variables, or parameters, are derived from the call signal. In the case of an ordinary telephone call, the call signal takes the form of an analog, time-varying, voltage. That signal can be broken into spectral components. For example, the signal can be filtered, and different spectra can be extracted. The example 304 in FIG. 5 shows extraction of a spectrum ranging from 50 to 500 Hz. Multiple spectra are, of course, possible, such as 100-Hz bands, ranging from zero to the upper frequency limit of the telephone channel.

Also, that signal can be divided into time segments. Example 305 illustrates breaking the signal into the individual words which compose it.

Block 310 indicates that the call is played to an expert. The call in question is the actual call originally received on the telephone channel, and not the call existing after processing, to produce one of the variables extracted in block 300. However, noise suppression or filtering may be undertaken to improve clarity for the expert.

Block 315 indicates that the expert classifies the caller. Exemplary classifications are (1) angry, (2) stressed, (3) happy, (4) depressed, (5) fatigued, and so on.

In one form of the invention, the classification made by the expert is used by the invention, in order to select an appropriate response to the customer. That is, an expert listens to every call, or a sampling of the calls, and classifies each. Based on the classification, an appropriate overture is made to the customer.

In block 320, the variables extracted, or the initial call signals themselves, are correlated with the classification made in block 315. For example, the expert may classify three particular callers as (1) angry, (2) stressed, and (3) happy, respectively. Block 320 utilizes mathematical techniques, known in the art, which identify characteristics within the three call signals, or the extracted variables, which are unique to each caller.

These identified characteristics allow classification of future callers, by an automated process. For example, a future caller may deliver a call signal resembling that of the stressed caller discussed in the preceding paragraph. That caller would be classified as stressed.

Establishing correlations between (1) one or more time-changing variables, such as those in examples 304 and 305, and (2) another event, such as the classification made by the expert, is known in the art. One text which discusses such correlation is *Time Series Analysis: Forecast and Control*, by G. Box, G. Jenkins, and G. Reinsel (Prentice Hall, 1994, ISBN 013 060 7746). This text discusses the well-known "Box-Jenkins" analysis, is hereby incorporated by reference.

One Form of Invention

Figure 6:
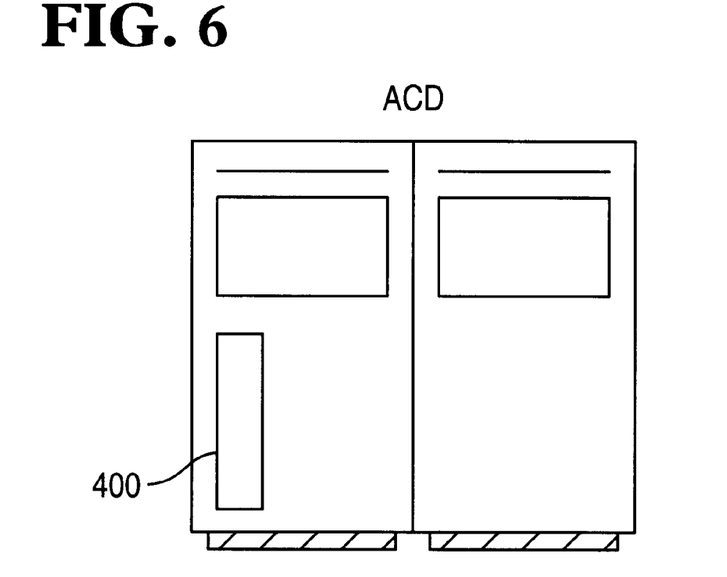
FIG. 6 illustrates one form of the invention.

FIG. 6 illustrates an ACD. Block 400 indicates software, hardware, firmware, or any combination of these, which performs the functions described herein.

Additional Considerations

1. Two approaches were described above, both of which provide similar results. In one approach, the calls are classified into categories. Later, when agents process the calls, the classification of each call provides helpful information, or cues, as to what the agent can expect in the content of the call.

In the other approach, the calls are not necessarily categorized, but a comment is generated, based on analysis of the call. As a simple example, the comment may contain the dozen, or so, most frequently used words within the call, or may list specific words, such as product names, which were found in the call. Later, when an agent processes the call, the comment provides a helpful cue.

Therefore, in these two approaches, both the comment and the classification provide a cue, or hint, as to what an agent later processing the call can expect as to the call's contents. But, of course, the cues, or hints, are of different types: classification versus comment.

2. From one perspective, the invention attempts to ascertain a caller's emotional or physiological state through two sources of information. One source is the verbal information delivered by a caller. The second is the non-verbal information carried by the caller's speech signal. The invention classifies the caller, based on one, or both, sources of information. For example, the invention may classify a given caller as a stressed male, calling about a specific product.

The inventors emphasize that perfect accuracy in classifying the callers is not necessarily required. One reason is that a primary purpose of the classification process is to allow the agents to identify callers who appear to be in a non-normal physical, or mental, condition. Restated, one purpose is to identify callers who appear to be non-average to a significant degree.

Once this identification has been made, the agents can direct special attention to the non-average callers. For example, if a caller appears to be irate, and identifies a particular product, the agents may send a personal letter to the caller inquiring about the problem, or otherwise communicate concern to the caller in a personal and attentive way.

It is clear that perfect accuracy in classifying the callers is not required. One reason is that identifying even a few non-average callers, and devoting special attention to them, represents an improvement over the situation wherein no identification is made at all.

Further, one particular error, namely, misidentification of satisfied callers as unsatisfied, poses no problem: special attention given to such callers is expected to be received courteously.

Therefore, perfect classification of the callers, using the techniques described above, is not required. Imperfect classification produces useful results.

3. Continuing point 2, absolute accuracy in classification of callers is perhaps not the best measure of success of the invention. Rather, comparative success of the invention against other approaches is a useful measure.

For example, an organization may suspect that some of its customers are dissatisfied. The organization decides to survey of a sample of its customers, in order to question them about their attitudes toward the organization.

Those customers can be selected at random. On the other hand, they can be selected using the invention: recordings of calls received from customers can be analyzed, and, of those customers, dissatisfied customers are identified.

This latter identification process, even if not perfectly accurate, is superior to random selection. It is reasonable to assume that more dissatisfied customers will be contacted using the invention, compared with random selection.

Therefore, in a sense, one purpose of the invention is to identify a group of callers sharing a common trait, and the identification need not be completely accurate.

4. The preceding discussion presumed that the callers were the focus of the analysis. However, in another form of the invention, the agents of FIG. 1 become the focus. Their mental and physical states are examined by the invention, through examining their telephone calls. For example, if analysis of a particular agent indicates that the agent is unduly stressed, remedial measures can be taken.

5. Two specific applications of the invention are the following:

a) Emergency telephone services, such as the familiar "911" organizations in the U.S., can analyze calls in real-time, to identify truly urgent calls, compared with ordinary calls.

b) Telephone marketing organizations can perform an initial screening of callers. For example, a caller's introductory greeting (e.g., "Hello, this is Madeline Wilson") can be analyzed by the invention. Alternately, the caller can be prompted to speak a few sentences, for analysis. The invention classifies the caller using the principles described above, selects an agent based on the analysis, and then directs the caller to that agent. For example, certain agents may be specially trained to deal with callers who exhibit specific emotional traits, such as unhappiness.

6. The caller may be requested to assist the classification process scribed herein. That is, in FIG. 7, block 405 indicates that a message is played to the caller, inviting the caller to summarize the call. Block 410 indicates that a message is played which states the possible categories into which the call can be placed. The caller responds by pressing a telephone key. The invention recognizes the DTMF signal produced (Dual-Tone, Multi-Frequency), and records the category.

Figure 7:
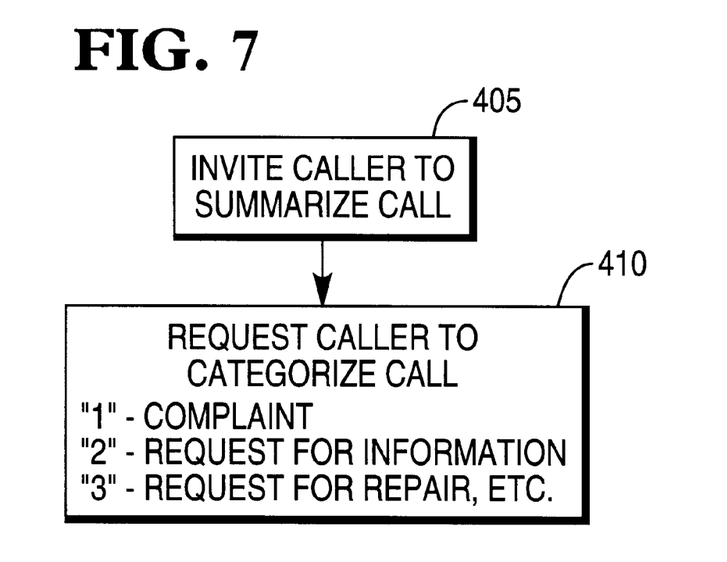

Preferably, this operation is undertaken when an incoming call is recorded, as occurs when no agent is free to handle the call. The category chosen in block 410 is stored in association with the recorded call.

Numerous substitutions and modifications can be undertaken without departing from the true spirit and scope of the invention. What is desired to be secured by Letters Patent is the invention as defined in the following claims.

What is claimed is:

1. Method of operating an automated call distribution center, ACD, comprising:
   a) receiving a signal carrying an incoming telephone call from a caller;
   b) making a histogram indicating number of times selected words are used by the caller;
   c) selecting an agent from a group of agents, based on the histogram; and
   d) routing the call to the selected agent.

2. Method according to claim 1, wherein the routing is done without resort to verbal content of the call.

3. A method of operating an automated call distribution center, ACD, comprising the following steps:
   a) receiving a call from a human caller:
   b) identifying verbal content of the call, without human intervention using speech-recognition apparatus; and
   c) generating a comment about the call, using the verbal content, wherein the comment identifies at least one word used multiple times in the call, and the number of times used.

4. A method of operating an automated call distribution center, ACD, comprising the following steps:
   a) receiving a call from a human caller:
   b) identifying verbal content of the call, without human intervention using speech-recognition apparatus; and
   c) generating a comment about the call, using the verbal content, wherein the comment identifies the word used most often in the call.

* * * * *